(12) United States Patent
Kistner et al.

(10) Patent No.: US 9,828,995 B2
(45) Date of Patent: Nov. 28, 2017

(54) COMPRESSOR AND OIL DRAIN SYSTEM

(71) Applicant: GHH Rand Schraubenkompressoren GmbH, Oberhausen (DE)

(72) Inventors: Daniel Kistner, Munster (DE); Frank Banaszak, Recklinghausen (DE); Michael Besseling, Hunxe (DE)

(*) Notice: Subject to any disclaimer, the term of this patent is extended or adjusted under 35 U.S.C. 154(b) by 223 days.

(21) Appl. No.: 14/522,270

(22) Filed: Oct. 23, 2014

(65) Prior Publication Data
US 2016/0115956 A1 Apr. 28, 2016

(51) Int. Cl.
| | |
|---|---|
| F03C 2/00 | (2006.01) |
| F03C 4/00 | (2006.01) |
| F04C 15/00 | (2006.01) |
| F04C 2/00 | (2006.01) |
| F04C 18/16 | (2006.01) |
| F16C 33/66 | (2006.01) |
| F04C 29/02 | (2006.01) |

(Continued)

(52) U.S. Cl.
CPC ............. *F04C 18/16* (2013.01); *F04C 29/02* (2013.01); *F04C 29/028* (2013.01); *F04C 29/12* (2013.01); *F16C 33/6685* (2013.01); *F04C 23/001* (2013.01); *F04C 2240/50* (2013.01); *F04C 2240/52* (2013.01); *F16C 33/6659* (2013.01)

(58) Field of Classification Search
CPC ........ F04C 18/16; F04C 29/02; F04C 29/028; F04C 29/04; F04C 29/12; F04C 23/001; F04C 23/008; F04C 2240/50; F01C 1/16; F01C 21/04; F16C 33/102; F16C 33/6685; F16C 33/10; F16C 33/6659

USPC ...... 418/9, 88, 99, 101, 196, 199, 201.1, 97, 418/98, 100; 384/400, 322, 462; 184/6.16–6.17
See application file for complete search history.

(56) References Cited

U.S. PATENT DOCUMENTS

| | | | |
|---|---|---|---|
| 4,076,468 A | | 2/1978 | Persson et al. |
| 4,394,113 A | * | 7/1983 | Bammert .............. F04C 29/02 |
| | | | 418/98 |

(Continued)

FOREIGN PATENT DOCUMENTS

| | | |
|---|---|---|
| DE | 29922878 | 6/2001 |
| EP | 2314874 A1 | 4/2011 |

(Continued)

OTHER PUBLICATIONS

Belgium Patent Office Search Report with Examiner's Written Opinion dated Sep. 8, 2016 cited in counterpart Belgium Patent Application No. BE201505683 (12 pages).

(Continued)

*Primary Examiner* — Theresa Trieu
(74) *Attorney, Agent, or Firm* — Taft, Stettinius & Hollister LLP (57) ABSTRACT

A unique compressor system may include a compressor having a compressor housing. The compressor housing may include an oil drainage passage formed therein. The passage may be configured to drain oil from bearings and other oil-lubricated components of the compressor. The compressor may be coupled to a gearbox or an oil tank. The gearbox or oil tank may include a passage that is in fluid communication with the oil drainage passage. The gearbox or oil tank passage may be operative to receive the drained oil and to direct the drained oil to an oil tank.

18 Claims, 4 Drawing Sheets

(51) Int. Cl.
 *F04C 29/12* (2006.01)
 *F04C 23/00* (2006.01)

(56) References Cited

U.S. PATENT DOCUMENTS

| | | | |
|---|---|---|---|
| 4,478,054 A | | 10/1984 | Shaw et al. |
| 4,758,136 A | | 7/1988 | Pamlin et al. |
| 5,037,282 A | | 8/1991 | Englund |
| 5,727,936 A | * | 3/1998 | Eriksson ................ F04C 29/02 418/88 |
| 6,422,844 B2 | | 7/2002 | Hioki et al. |
| 7,510,381 B2 | * | 3/2009 | Beckmann .............. F04C 29/02 418/98 |
| 7,690,901 B2 | | 4/2010 | Achtelik et al. |
| 2009/0246054 A1 | * | 10/2009 | Achtelik ................ F04C 18/16 418/9 |
| 2011/0135528 A1 | | 6/2011 | Amano |
| 2012/0148435 A1 | | 6/2012 | Takaki |

FOREIGN PATENT DOCUMENTS

| | | |
|---|---|---|
| GB | 2115876 A | 9/1983 |
| WO | 2007128309 | 11/2007 |

OTHER PUBLICATIONS

Belgium Patent Office English Translation of Examiner's Written Opinion of Belgium Search Report dated Sep. 8, 2016 cited in counterpart Belgium Patent Application No. BE201505683 (3 pages).

* cited by examiner

COMPRESSOR AND OIL DRAIN SYSTEM

FIELD OF THE INVENTION

The present invention relates to compressor systems, and more particularly to systems and methods for oil drainage from a compressor.

BACKGROUND

Compressor systems, such as air compressor systems, remain an area of interest. Some existing systems have various shortcomings, drawbacks, and disadvantages relative to certain applications. For example, some air compressors employ external plumbing for draining lubrication oil from the compressor. The plumbing may leak under some conditions. Accordingly, there remains a need for further contributions in this area of technology.

SUMMARY

Embodiments of the present invention include a unique compressor system. The compressor system may include a compressor having a compressor housing. The compressor housing may include an oil drainage passage formed therein. The passage may be configured to drain oil from bearings and other oil-lubricated components of the compressor. The compressor may be coupled to a gearbox or an oil tank. The gearbox or oil tank may include a passage that is in fluid communication with the oil drainage passage. The gearbox or oil tank passage may be operative to receive the drained oil and to direct the drained oil to an oil tank.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figures 1A, 1B, 1C, 1D, 1E:
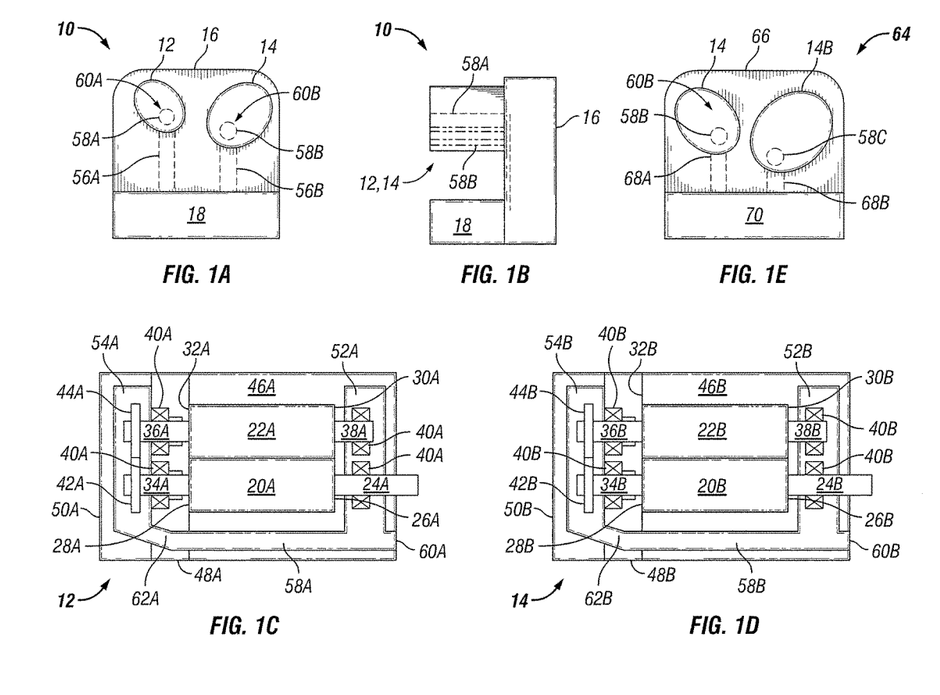
FIGS. 1A-1E schematically depict some aspects of non-limiting examples of compressor systems having compressors with internal oil drainage passages in accordance with of some embodiments of the present invention.

Referring to FIGS. 1A and 1B, some aspects of a non-limiting example of a compressor system 10 in accordance with an embodiment of the present invention are schematically depicted. Compressor system 10 includes a compressor 12, a compressor 14, a gearbox 16 and an oil tank 18. In one form, compressor system 10 is a two-stage compressor system that compresses a fluid, e.g., air, which is then discharged from compressor system 12. In one form, compressor 12 is a second stage compressor, and compressor 14 is a first stage compressor. In other embodiments, compressors 12 and 14 may operate in parallel, or compressor 14 may be a second stage compressor and compressor 12 a first stage compressor. In various embodiments, compressor system 10 may be any single or multistage compressor system having one or more compressors. In one form, each of compressors 12 and 14 are oil-free screw compressors. In other embodiments, compressors 12 and 14 may take other forms.

Gearbox 16 is in mechanical communication with compressors 12 and 14, and supplies mechanical power to operate compressors 12 and 14. Oil tank 18 is coupled to gearbox 16, and receives lubricating oil that is drained from oil-lubricated components of compressors 12 and 14, and in some cases, gearbox 16 as well. In some embodiments, oil tank 18 may be directly coupled to compressors 12 and 14. In various embodiments, the drained oil may then be conditioned, e.g., filtered and/or cooled. The oil is then delivered, e.g., under pressure, to various components of compressors 12 and 14, and in some embodiments, gearbox 16, for lubrication of various components, e.g., bearings and gears. Some embodiments may not employ a gearbox 16. In some embodiments gearbox 16 and oil tank 18 may be integral.

Referring now to FIGS. 1C and 1D, compressors 12 and 14 each include two intermeshing compressor elements in the form of screw compressor rotors, which are respective driving screws 20A, 20B and driven screws 22A, 22B. Driving screws 20A, 20B include respective shaft portions 24A, 24B extending from ends 26A and 26B of screws 20A, 20B. Shaft portions 24A and 24B are mechanically coupled to and receive rotational power from gearbox 16 for rotating respective screws 20A, 20B. Extending from ends 28A, 28B; 30A, 30B; and 32A, 32B of respective screws 20A, 20B and 22A, 22B are shaft portions 34A, 34B; 36A, 36B and 38A, 38B. Each of driving screws 20A, 20B and driven screw 22A, 22B are supported at respective ends 26A, 26B; 28A, 28B; 30A, 30B; and 32A, 32B by bearings 40A, 40B coupled to shaft portions 24A, 24B; 34A, 34B; 36A, 36B and 38A, 38B. In one form, bearings 40A, 40B are rolling element bearings. In one form, each of bearings 40A and 40B represent roller bearings and/or ball bearings. For example, in one form, each of bearings 40A and 40B that are disposed on shafts 34A, 34B and shafts 36A, 36B represent a combination of both roller bearings and ball bearings, whereas each of bearings 40A and 40B that are disposed on shafts 24A, 24B and shafts 38A, 38B represent roller bearings. In various embodiments, each of bearings 40A and 40B may represent roller bearings and/or ball bearings and/or one or more other types of bearings. Coupled to respective ends 28A, 28B and 32A, 32B of screws 20A, 20B and 22A, 22B are gears 42A, 42B and 44A, 44B. Gears 42A, 42B and 44A, 44B are mounted on respective shaft portions 34A, 34B and 36A, 36B. Gears 44A, 44B are driven by input gears 42A, 42B. In one form, gears 42A, 42B and 44A, 44B maintain timing between respective driving screws 20A, 20B and driven screws 22A, 22B.

Compressors 12 and 14 include cast rotor housings 46A and 46B; cast discharge housings 48A and 48B; and discharge side covers 50A and 50B. Cast discharge housings 48A and 48B are attached to respective cast rotor housings 46A and 46B; and discharge side covers 50A and 50B are attached to respective cast discharge housings 48A and 48B. Rotor housings 46A and 46B radially encompass driving screws 20A, 20B and driven screws 22A, 22B between ends 26A, 26B; 28A, 28B; 30A, 30B; and 32A, 32B. In various embodiments, rotor housings 46A and 46B define all or part of sumps 52A, 52B, which are adjacent to screw ends 26A, 26B and 30A, 30B. In some embodiments, gearbox 16 may also define sumps 52A, 52B all or in part. Sumps 52A, 52B house the bearings 40A and 40B that are disposed on shafts 24A, 24B and shafts 38A, 38B. Cast discharge housings 48A and 48B and discharge side covers 50A and 50B define sumps 54A and 54B, which are adjacent to screw ends 28A, 28B and 32A, 32B. Sumps 54A and 54B house the bearings 40A and 40B that are disposed on shafts 34A, 34B and shafts 36A, 36B Sumps 54A and 54B also house respective gears 42A, 42B and 44A, 44B. During the operation of compressors 12 and 14, oil is supplied to lubricate bearings 40A and 40B and gears 42A, 42B and 44A, 44B in respective sumps 52A, 52B and 54A, 54B.

Gearbox 16 includes built-in passages 56A, 56B for receiving lubricating oil that is drained from respective compressors 12 and 14. In one form, gearbox 16 includes a cast housing into which built-in passages 56A, 56B are formed as cast passages. In other embodiments, gearbox 16 may not include a cast housing. In various embodiments, built-in passages 56A and/or 56B may take any suitable form, including, for example, machined passages. In some embodiments, internal pipes, tubing, flexible or rigid hoses or the like may be employed. Built-in passages 56A, 56B are in fluid communication with oil tank 18 for delivering oil drained from compressors 12 and 14 to oil tank 18.

Compressors 12 and 14 include respective built-in cast oil drainage passages 58A, 58B having respective discharge openings 60A, 60B. In one form, each built-in cast oil drainage passage 58A, 58B includes a single respective discharge opening 60A, 60B. In other embodiments, each built-in cast oil drainage passage 58A, 58B may have a plurality of respective discharge openings 60A, 60B. Discharge openings 60A, 60B may have any shape, e.g., any cross sectional shape, suitable for the application. Built-in cast oil drainage passages 58A, 58B extend through rotor housings 46A and 46B between the ends of the compressor screws, and include portions 62A, 62B that extend through discharge housings 48A and 48B. Drainage passages 58A, 58B, discharge openings 60A, 60B, and portions 62A, 62B of drainage passages 58A, 58B are formed as cast passages/openings within the respective cast rotor housings 46A and 46B and cast discharge housings 48A and 48B. Built-in cast oil drainage passages 58A, 58B extend between respective sumps 52A, 52B and sumps 54A, 54B. Cast oil drainage passages 58A, 58B are in fluid communication with both sumps 52A, 52B and sumps 54A, 54B, and are structured to collect and drain the oil used to lubricate bearings 40A and 40B and gears 42A, 42B and 44A, 44B from both sumps 52A, 52B and sumps 54A, 54B, without the use of external pipework. That is, built-in cast oil drainage passages 58A, 58B alone drain the lubricating oil from both respective sumps 52A, 52B and sumps 54A, 54B, without the use of any other drainage means, such as piping, tubing, hoses or the like that are external to rotor housings 46A and 46B, discharge housings 48A and 48B and discharge side covers 50A and 50B.

Oil drainage passages 58A, 58B and discharge openings 60A, 60B are in fluid communication with built-in passages 56A, 56B of gearbox 16 and are operative to drain oil to gearbox 16 without the use of any external plumbing. That is, by using internal passages such as passages 58A, 58B, i.e., passages that are internal to the compressor, the use of external fittings, hoses and the like on compressors 12 and 14 are avoided. Such external fittings may tend to leak, e.g., due to vibrations or other causes, and hence, in some embodiments, the use of the internal passages may eliminate such potential leakage paths. Similarly, by using built-in passages 56A, 56B, i.e., passages that are internal to and built into the gearbox, the use of external fittings, hoses and the like are likewise avoided.

Built-in cast oil drainage passages 58A, 58B are structured to drain and discharge the lubricating oil from sumps 52A, 52B and sumps 54A, 54B into built-in passages 56A, 56B. In some embodiments, oil drainage passages 58A, 58B with discharge openings 60A, 60B may be in direct fluid communication with oil tank 18 in addition to or in place of built-in passages 56A, 56B of gearbox 16, and may be operative to drain oil thereto.

Figure 7:
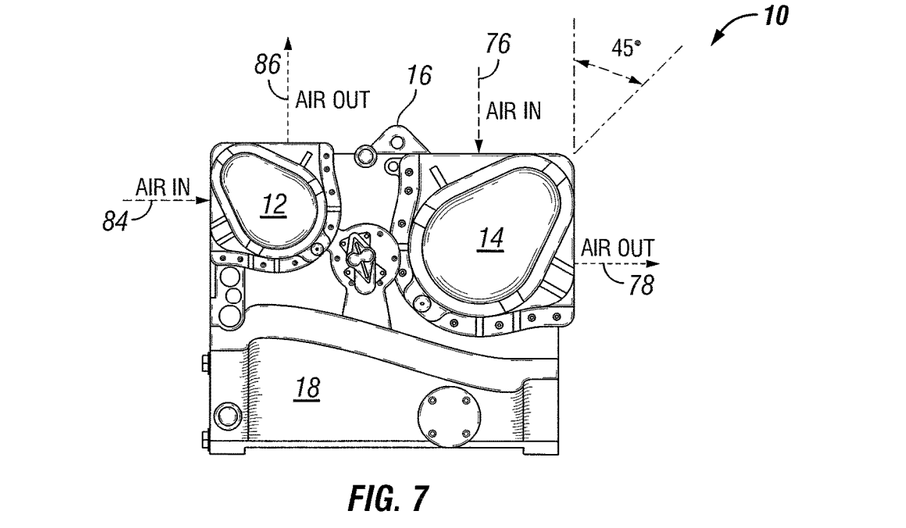
FIG. 7 schematically depicts some aspects of a non-limiting example of a compressor system having a compressor with an internal oil drainage passage, wherein the compressor is installed in one rotational orientation in accordance with an embodiment of the present invention.
Figure 8:
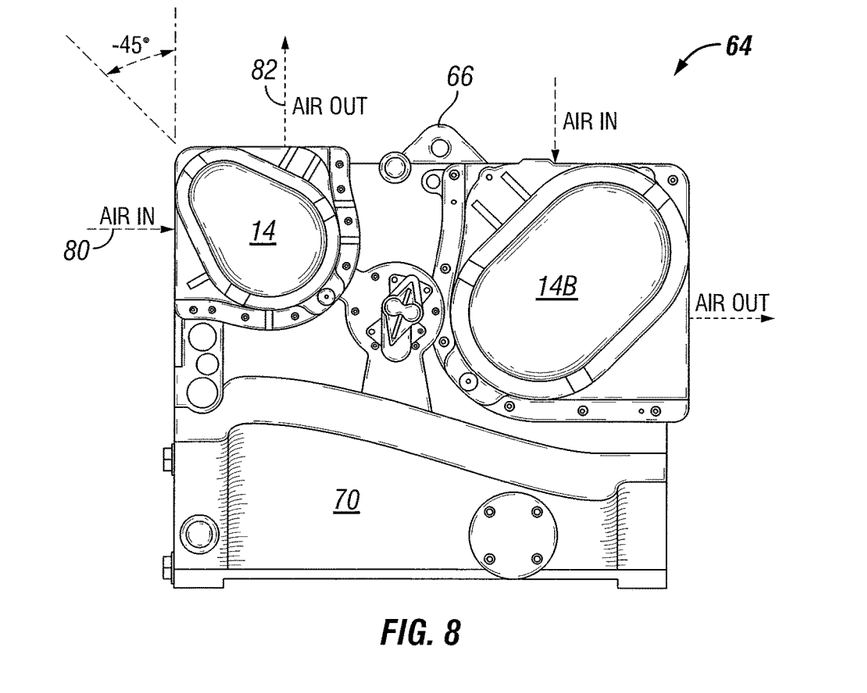
FIG. 8 schematically depicts some aspects of a non-limiting example of a compressor system having a compressor with an internal oil drainage passage, wherein the compressor is installed in another rotational orientation relative to that of FIG. 7, in accordance with an embodiment of the present invention.

In some embodiments, drainage passages 58A and/or 58B, along with respective discharge openings 60A and/or 60B are structured, e.g., in geometry, size and location, to allow respective compressor 12 and/or 14 to be installed at different rotational angles or orientations, while still allowing adequate drainage of lubricating oil from the respective sumps 52A, 52B and sumps 54A, 54B, e.g., oil used to lubricate bearings 40A, 40B and bearings and gears 42A, 42B and 44A, 44B of compressors 12 and 14. The different installation orientations may be desirable for one or more reasons, e.g., in order to reduce the overall size, weight and/or cost of the compressor system. For example, it may be desired to install a compressor in a second installation at a different rotational orientation than the first orientation for reasons such as, but not limited to, reducing overall compressor system package size, e.g., by minimizing a center-line distance between the gearbox output gear axis of rotation and the compressor input gear axes of rotation, e.g., input gears 42A, 42B. Additional reasons may include, for example and without limitation, aligning a compressor with air intake and discharge manifolds (an example of which is illustrated in FIGS. 7 and 8).

By structuring drainage passages 58A and/or 58B with respective discharge openings 60A and/or 60B such as to allow respective compressor 12 and/or 14 to be installed at different rotational angles while still allowing adequate drainage of lubricating oil from the respective sumps, bearings and gears, the same compressor may be used in more than one application. For example, referring to FIG. 1E, a compressor system 64 including a gearbox 66 with built-in drainage passages 68A, 68B, and an oil tank 70 may also employ the same compressor 14 as with compressor system 10, but in an orientation rotationally displaced from the orientation of FIG. 1A, e.g., rotated 90° from the orientation in which it is installed in compressor system 10. In this example, the compressors, gearbox and oil tank are cooperatively arranged and interconnected similarly to that of compressor system 10. In various embodiments, the second orientation of compressor 14 (that is, as installed onto gearbox 66) may be rotationally displaced by up to 90° or greater than 90° from the first orientation. Thus, in some embodiments, compressor 14 may be installed and employed in a different rotational orientation so that it may be utilized in a different compressor system.

For instance, whereas in the embodiments of FIGS. 1A and 1B compressor 14 is a first stage compressor disposed at one rotational orientation, in other embodiments, the same compressor 14 with passage 58B having discharge opening 60B may be installed into another compressor system, e.g., compressor system 64, in which it is a second stage compressor that is utilized in conjunction with a larger or other similar or different first stage compressor 14B, e.g., which may have an oil drainage passage 58C, akin to oil drainage passages 58A, 58B. In the installation of compressor system 64, compressor 14 may be desirably installed in a different rotational orientation, e.g., a rotational orientation that is 90° different than that of compressor system 10 of FIG. 1A. Accordingly, in some embodiments the same compressor may be employed, e.g., without modification, in systems that employ the compressor as a second stage compressor installed in a first rotational orientation and also in systems that employ the compressor as a first stage compressor installed in a second orientation that is rotationally displaced from the first orientation.

Thus, by configuring or structuring the oil drainage passage, e.g., oil drainage passage 58B in the example just given, to allow adequate drainage at different installed rotational orientations, a lower cost, weight and/or size may be achieved. In other embodiments, the same compressor, e.g., without modification, may be employed in systems that employ that compressor, e.g., compressor 14, as the only compressor in a single stage compressor system. In various embodiments, passages 58A and/or 58B may be structured, e.g., in geometry, size and/or location, such as to allow respective compressor 12 and/or 14 to be installed at different rotational angles, e.g., anywhere between plus or minus 45 or more degrees of rotation from a nominal orientation, while still allowing adequate drainage of lubricating oil from bearings, gears and the like from compressors 12 and 14.

Referring to FIGS. 2A-2D, 3A-3D and 4A-4D, some examples that reflect a few of many potential configurations of oil drainage passages are illustrated using oil drainage passage 58B and compressor 14 as an example. The oil drainage passages allow the compressor to be installed at different rotational angles, e.g., anywhere between plus or minus 45° or more degrees of rotation from nominal (0°), or an otherwise 90 degree rotation from a first rotational orientation to a second rotational orientation while still allowing adequate drainage of lubricating oil. In other embodiments, the allowable variation in rotational orientation may be less than 90°, whereas in still other embodiments, the allowable variation in rotational orientation may be greater than 90°, while still adequately draining oil from the bearings and gears and other oil lubricated components in the sumps. The examples are equally applicable to oil drainage passage 58A and compressor 12.

Figure 2A:
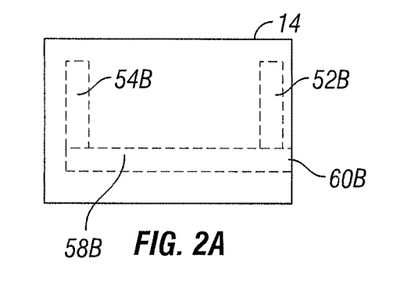
FIGS. 2A-2D schematically depict some aspects of a non-limiting example of a compressor with an internal oil drainage passage in accordance with an embodiment of the present invention.
Figure 2B:
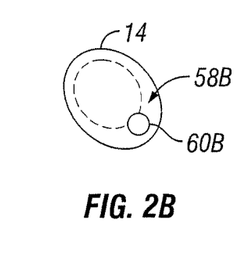
Figure 2C:
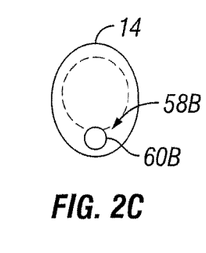
Figure 2D:
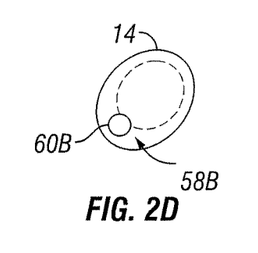

In the depiction of FIGS. 2A-2D, oil drainage passage 58B and discharge opening 60B are circular in cross-section. The diameter, shape, and the location, e.g., the radial and circumferential positions relative to sumps 52B and 54B, of the oil drainage passage and discharge opening are structured to allow lubricating oil to drain from sumps 52B and 54B and the oil-lubricated components therein, e.g., bearings and gears, in a compressor angular or rotational orientation of −45° (FIG. 2B), in an angular or rotational orientation of −0° (FIG. 2C), and in an angular or rotational orientation of 45° (FIG. 2D). It will be understood, in view of the present disclosure, that in some embodiments, passage 58B, including discharge opening 60B, may be structured to drain oil from the sumps when the compressor is installed in a first orientation and also when the compressor is installed in a second orientation rotationally displaced 90° from the first orientation, as well as orientations therebetween in other embodiments, and in still other embodiments, greater than a 90° rotational displacement.

Figure 3A:
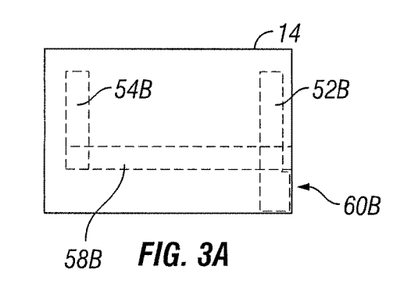
FIGS. 3A-3D schematically depict some aspects of a non-limiting example of a compressor with an internal oil drainage passage in accordance with an embodiment of the present invention.
Figure 3B:
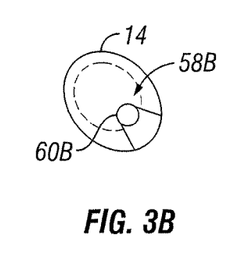
Figure 3C:
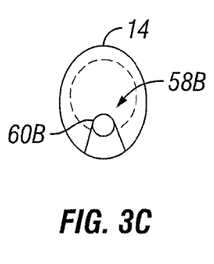
Figure 3D:
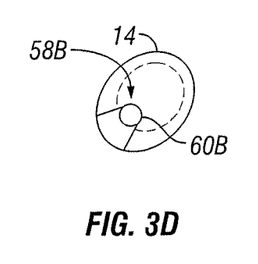

In the depiction of FIGS. 3A-3D, oil drainage passage 58B is circular in cross-section, and discharge opening 60B is fan-shaped. The size, shape, and the location, e.g., radial and circumferential positions relative to sumps 52B and 54B, of the oil drainage passage and discharge opening are structured to allow lubricating oil to drain from sumps 52B and 54B and the oil-lubricated components therein, e.g., bearings and gears, in a compressor angular or rotational orientation of −45° (FIG. 3B), in an angular or rotational orientation of −0° (FIG. 3C), and in an angular or rotational orientation of 45° (FIG. 3D). It will be understood, in view of the present disclosure, that in some embodiments, passage 58B, including discharge opening 60B, may be structured to drain oil from the sumps when the compressor is installed in a first orientation and also when the compressor is installed in a second orientation rotationally displaced 90° from the first orientation, as well as orientations therebetween in other embodiments, and in still other embodiments, greater than a 90° rotational displacement.

Figure 4A:
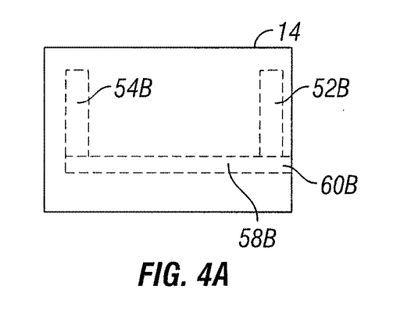
FIGS. 4A-4D schematically depict some aspects of a non-limiting example of a compressor with an internal oil drainage passage in accordance with an embodiment of the present invention.
Figure 4B:
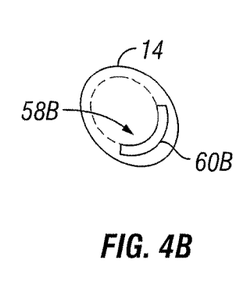
Figure 4C:
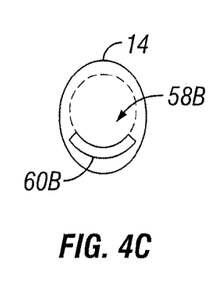
Figure 4D:
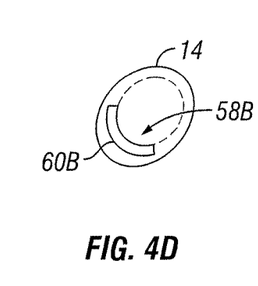

In the depiction of FIGS. 4A-4D, oil drainage passage 58B and discharge opening 60B have partial annular cross-sectional shapes. The size, shape, and the location, e.g., radial and circumferential positions relative to sumps 52B and 54B, of the oil drainage passage and discharge opening are structured to allow lubricating oil to drain from sumps 52B and 54B and the oil-lubricated components therein, e.g., bearings and gears, in a compressor angular or rotational orientation of −45° (FIG. 4B), in an angular or rotational orientation of −0° (FIG. 4C), and in an angular or rotational orientation of 45° (FIG. 4D). It will be understood, in view of the present disclosure, that in some embodiments, passage 58B, including discharge opening 60B, may be structured to drain oil from the sumps when the compressor is installed in a first orientation and also when the compressor is installed in a second orientation rotationally displaced 90° from the first orientation, as well as orientations therebetween in other embodiments, and in still other embodiments, greater than a 90° rotational displacement.

Figure 5:
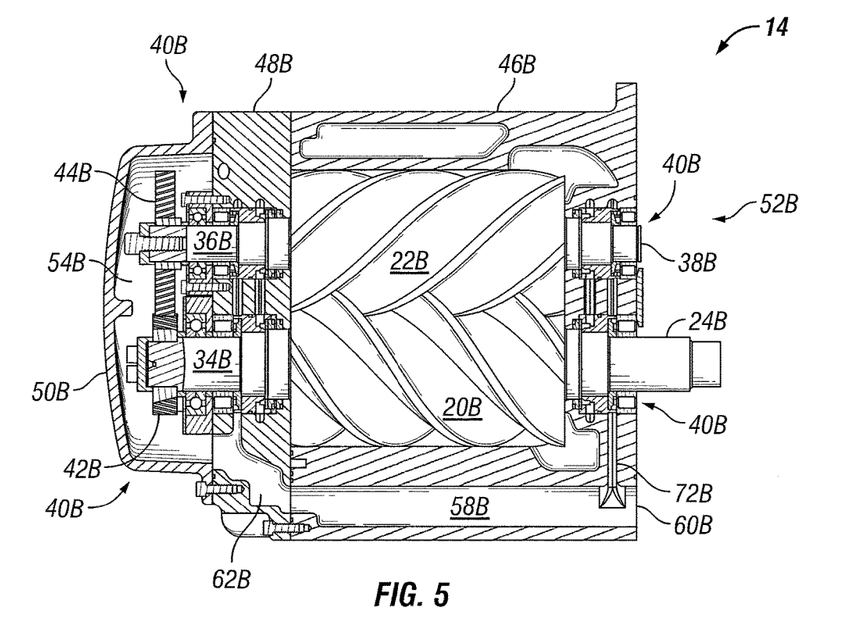
FIG. 5 schematically depicts some aspects of a non-limiting example of a compressor with an internal oil drainage passage in accordance with an embodiment of the present invention.
Figure 6:
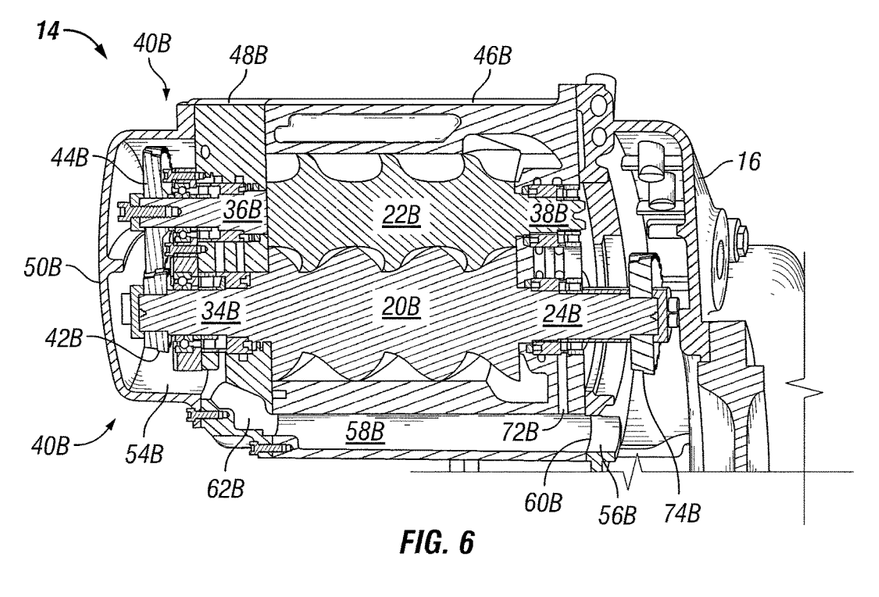
FIG. 6 schematically depicts some aspects of a non-limiting example of a compressor with an internal oil drainage passage in accordance with an embodiment of the present invention.

Referring to FIGS. 5 and 6, some aspects of a non-limiting example of compressor 14 are further illustrated. FIG. 5 illustrates an auxiliary drainage passage 72B that is operative to drain oil from bearings 40B in sump 52B into drainage passage 58B. FIG. 6 illustrates discharge opening 60B of compressor 14 in fluid communication with passage 56B of gearbox 16. FIG. 6 also illustrates a gear 74B mounted on shaft 24B for receiving mechanical power from gearbox 16 to drive compressor 14.

Referring to FIGS. 7 and 8, some aspects of non-limiting examples of compressor systems 10 and 64 are illustrated in accordance with some embodiments of the present invention. FIG. 7 illustrates compressor 14 installed onto gearbox 16 in an orientation of 45° as a first stage of a two-stage compressor system, whereas FIG. 8 illustrates the same compressor 14, but installed onto gearbox 66 in a −45° orientation as the second stage of a larger two-stage compressor system. In compressor system 10, air is supplied to compressor 14 in a vertically downward direction 76, and is discharged in a direction 78 horizontally to the right. By changing the rotational orientation by 90°, compressor 14 is oriented on gearbox 66 in a manner such that air is supplied to it in a direction 80 horizontally to the right, and is discharged in a vertically upward direction 82 from compressor. Directions 80 and 82 correspond to directions that may be preferred. The ability to adequately drain oil in more than one orientation allows ready scaling of a compressor system, whereby familiar features, structures, spatial relationships between components of the compressor systems, and the like may be maintained, and stems from the size, shape, and the location, e.g., radial and circumferential positions relative to sumps 52B and 54B, of the oil drainage passage (e.g., 58A and/or 58B) and discharge opening (e.g., 60A and/or 60B) employed in some embodiments of the present invention. For example, it is noted that directions 80 and 82 for compressor 14 installed in compressor system 64 correspond to directions 84 and 86 for compressor 12 for air intake and discharge when installed as a second stage compressor of a two-stage compressor system. By structuring built-in cast oil drainage passages 58A, 58B to drain oil in different rotational orientations, including orientations displaced by 90°, some embodiments of compressors 12 and 14 may thus be installed in different compressor systems as first or second stage compressors without changing the compressor hardware, or by making minimal hardware changes relative to compressors that do not employ the built-in cast oil drainage passages 58A, 58B described herein.

Embodiments of the present invention include a compressor system, comprising: a compressor, comprising a plurality of intermeshing compressor elements, each intermeshing compressor element having a first end and a second end; a first plurality of oil-lubricated bearings supporting the first end of each intermeshing compressor element; a second plurality of oil-lubricated bearings supporting the second end of each intermeshing compressor element; a compressor housing radially encompassing the intermeshing compressor elements between the first ends and the second ends; and a passage formed within the compressor housing and spaced apart from the intermeshing compressor elements, the passage extending through the housing between the first ends and the second ends of the intermeshing compressor elements, wherein the passage is structured to drain oil from at least one of the first plurality of oil-lubricated bearings and the second plurality of oil-lubricated bearings.

In a refinement, the compressor system further comprises a first gear, and a second gear driven by the first gear, wherein the first gear is coupled to a first intermeshing compressor element, wherein the second gear is coupled to a second intermeshing compressor, and wherein the passage is operative to drain oil used to lubricate the first gear and the second gear.

In another refinement, the passage includes a single discharge opening, and is operative to drain oil used to lubricate the first plurality of bearings and the second plurality of bearings, and to discharge the drained oil through the single discharge opening.

In yet another refinement, the compressor system further comprises a first sump and a second sump, wherein the first sump is disposed adjacent to the first ends of the intermeshing compressor elements and houses the first plurality of bearings; and wherein the second sump is disposed adjacent to the second ends of the intermeshing compressor elements and houses the second plurality of bearings, wherein the passage extends between the first sump and the second sump, is in fluid communication with both the first sump and the second sump, and is operative to drain oil from the first sump and the second sump.

In still another refinement, one of the first sump and the second sump is at least partially disposed within the cast discharge housing.

In yet still another refinement, the compressor housing further comprises a cast rotor housing and a cast discharge housing, wherein the passage is formed of a first cast passage in the cast rotor housing and a second cast passage in the cast discharge housing.

In a further refinement, the compressor system is configured as an oil-free screw compressor system.

In a yet further refinement, the compressor housing includes a casting; and wherein the passage is a cast passage within the casting.

In a still further refinement, the compressor system further comprises at least one of a gearbox and an oil tank, wherein the passage is in fluid communication with the at least one of the gearbox and the oil tank and operative to drain oil to the at least one of the gearbox and the oil tank without the use of any external plumbing.

In a yet still further refinement, the passage is a first passage, further comprising a built-in second passage in the at least one of the gearbox and the oil tank for draining oil from the compressor; wherein the first passage includes a discharge opening in direct fluid communication with the second passage and is operative to discharge the drained oil into the second passage.

In another refinement, the passage is structured to drain lubrication oil from at least one of the first plurality of oil-lubricated bearings and the second plurality of oil-lubricated bearings when the compressor is installed in a first orientation and also when the compressor is installed in a second orientation rotationally displaced from the first orientation.

In yet another refinement, the passage is structured to drain oil from the first plurality of oil-lubricated bearings and the second plurality of oil-lubricated bearings when the compressor is installed in a first orientation and also when the compressor is installed in a second orientation rotationally displaced 90° from the first orientation.

Embodiments of the present invention include an oil-free screw compressor, comprising: a plurality of intermeshing compressor elements, each intermeshing compressor element having a first end and a second end; a first plurality of oil-lubricated bearings supporting the first ends of each intermeshing compressor element; a second plurality of oil-lubricated bearings supporting the second ends of each intermeshing compressor element; a compressor housing radially encompassing the intermeshing compressor elements between the first ends and the second ends; and a passage formed within the compressor housing and spaced apart radially from the intermeshing compressor elements, wherein the passage is structured to drain oil from at least of the first plurality of oil-lubricated bearings and to the second plurality of oil-lubricated bearings.

In a refinement, the compressor further comprises a first gear, and a second gear driven by the first gear, wherein the first gear is coupled to a first intermeshing compressor element, wherein the second gear is driven is coupled to a second intermeshing compressor element, and wherein the passage is operative to drain oil used to lubricate the first gear and the second gear.

In another refinement, the passage is operative to drain oil from the first gear, the second gear, the first plurality of bearings and the second plurality of bearings, and is structured to discharge the drained oil through a single discharge opening.

In yet another refinement, the compressor further comprises a first sump and a second sump, wherein the first sump is disposed adjacent to the first ends of the intermeshing compressor elements and houses the first plurality of bearings; and wherein the second sump is disposed adjacent to the second ends of the intermeshing compressor elements and houses the second plurality of bearings; wherein the passage is in fluid communication with the first sump and the second sump, and is structured to drain oil from the first sump and the second sump.

In still another refinement, the compressor housing includes a casting; and wherein the passage is a cast passage within the casting.

In yet still another refinement, the compressor housing includes a cast rotor housing and a cast discharge housing attached to the cast rotor housing, wherein the passage is formed of a first cast passage in the cast rotor housing and a second cast passage in the cast discharge housing.

In a further refinement, the compressor is configured to be mounted onto at least one of a gearbox and an oil tank; and wherein the compressor is structured to drain oil from the at least one of the first plurality of oil-lubricated bearings and the second plurality of oil-lubricated bearings into the at least one of the gearbox and the oil tank without the use of any external plumbing.

In a yet further refinement, the passage is positioned to drain oil from at least one of the first plurality of oil-lubricated bearings and the second plurality of oil-lubricated bearings when the compressor is installed in a first orientation and also when the compressor is installed in a second orientation rotationally displaced from the first orientation.

In a still further refinement, the passage is positioned to drain oil from the first plurality of oil-lubricated bearings and the second plurality of oil-lubricated bearings when the compressor is installed in a first orientation and also when the compressor is installed in a second orientation rotationally displaced 90° from the first orientation.

Embodiments of the present invention include a compressor system, comprising: a plurality of intermeshing compressor elements, each intermeshing compressor element having a first end and a second end; a first plurality of oil-lubricated bearings supporting the first end of each intermeshing compressor element; a second plurality of oil-lubricated bearings supporting the second end of each intermeshing compressor element; a compressor housing radially encompassing the intermeshing compressor elements between the first ends and the second ends; and means for draining oil from the first plurality of oil-lubricated bearings and the second plurality of oil-lubricated bearings.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A compressor system, comprising:
    a compressor, comprising a plurality of intermeshing compressor elements, each intermeshing compressor element having a first end and a second end;
    a first plurality of oil-lubricated bearings supporting the first end of each intermeshing compressor element;
    a second plurality of oil-lubricated bearings supporting the second end of each intermeshing compressor element;
    a compressor housing radially encompassing the intermeshing compressor elements between the first ends and the second ends;
    a passage formed within the compressor housing and spaced apart from the intermeshing compressor elements, the passage extending through the housing between the first ends and the second ends of the intermeshing compressor elements, wherein the passage is structured to drain oil from at least one of the first plurality of oil-lubricated bearings and the second plurality of oil-lubricated bearings; and
    a first gear, and a second gear driven by the first gear, wherein the first gear is coupled to a first intermeshing compressor element, wherein the second gear is coupled to a second intermeshing compressor, and wherein the passage is operative to drain oil used to lubricate the first gear and the second gear;
    wherein the passage includes a single discharge opening, and is operative to drain oil used to lubricate the first plurality of oil-lubricated bearings and the second plurality of oil-lubricated bearings, and to discharge the drained oil through the single discharge opening;
    a gearbox directly connected between the compressor housing and an oil tank; and
    an internal second passageway in the gearbox configured to connect the single discharge opening of the compressor housing to the oil tank without the use external plumbing conduits.

2. The compressor system of claim 1, further comprising a first sump and a second sump, wherein the first sump is disposed adjacent to the first ends of the intermeshing compressor elements and houses the first plurality of oil-lubricated bearings; and wherein the second sump is disposed adjacent to the second ends of the intermeshing compressor elements and houses the second plurality of oil-lubricated bearings, wherein the passage extends between the first sump and the second sump, is in fluid communication with both the first sump and the second sump, and is operative to drain oil from the first sump and the second sump.

3. The compressor system of claim 2, wherein one of the first sump and the second sump is at least partially disposed within a cast discharge housing.

4. The compressor system of claim 1, wherein the compressor housing further comprises a cast rotor housing and a cast discharge housing, wherein the passage is formed of a first cast passage in the cast rotor housing and a second cast passage in the cast discharge housing.

5. The compressor system of claim 1, wherein the compressor system is configured as an oil-free screw compressor system.

6. The compressor system of claim 1, wherein the compressor housing includes a casting; and wherein the passage is a cast passage within the casting.

7. The compressor system of claim 1, wherein the passage is a first passage, further comprising a built-in second passage in the at least one of the gearbox and the oil tank for draining oil from the compressor; wherein the first passage includes the single discharge opening in direct fluid communication with the built-in second passage and is operative to discharge the drained oil into the built-in second passage.

8. The compressor system of claim 1, wherein the passage is structured to drain lubrication oil from at least one of the first plurality of oil-lubricated bearings and the second plurality of oil-lubricated bearings when the compressor is installed in a first orientation and also when the compressor is installed in a second orientation rotationally displaced from the first orientation.

9. The compressor system of claim 8, wherein the passage is structured to drain oil from the first plurality of oil-lubricated bearings and the second plurality of oil-lubricated bearings when the compressor is installed in a first orientation and also when the compressor is installed in a second orientation rotationally displaced 90° from the first orientation.

10. The compressor system of claim 1, wherein the single discharge opening includes one of a circular, fan, or partial annular cross-sectional shape.

11. An oil-free screw compressor, comprising:
a plurality of intermeshing compressor elements, each intermeshing compressor element having a first end and a second end;
a first plurality of oil-lubricated bearings supporting the first ends of each intermeshing compressor element;
a second plurality of oil-lubricated bearings supporting the second ends of each intermeshing compressor element;
a compressor housing radially encompassing the intermeshing compressor elements between the first ends and the second ends;
a passage formed within the compressor housing and spaced apart radially from the intermeshing compressor elements, wherein the passage is structured to drain oil from at least of the first plurality of oil-lubricated bearings and to the second plurality of oil-lubricated bearings; and
a first gear, and a second gear driven by the first gear, wherein the first gear is coupled to a first intermeshing compressor element, wherein the second gear is coupled to a second intermeshing compressor element, and wherein the passage is operative to drain oil used to lubricate the first gear and the second gear;
a gearbox having built-in first and second drain passages coupled between the compressor housing and an oil tank, wherein the compressor is structured to drain oil from the at least one of the first plurality of oil-lubricated bearings and the second plurality of oil-lubricated bearings into the gearbox and then into the oil tank without the use of external plumbing; and
wherein the passage in the compressor housing and built-in first drain passage are configured to drain oil into the oil tank when the compressor housing is installed in a first position and a first rotational orientation and wherein the passage in the compressor housing and built-in second drain passage are configured to drain oil into the oil tank when the compressor housing is installed in a second position and second rotational orientation different from the first position and first rotational orientation.

12. The compressor of claim 11, wherein the passage is operative to drain oil from the first gear, the second gear, the first plurality of oil-lubricated bearings and the second plurality of oil-lubricated bearings, and is structured to discharge the drained oil through a single discharge opening.

13. The compressor system of claim 12, wherein the single discharge opening includes one of a circular, fan, or partial annular cross-sectional shape.

14. The compressor of claim 11, further comprising a first sump and a second sump, wherein the first sump is disposed adjacent to the first ends of the intermeshing compressor elements and houses the first plurality of oil-lubricated bearings; and wherein the second sump is disposed adjacent to the second ends of the intermeshing compressor elements and houses the second plurality of oil-lubricated bearings; wherein the passage is in fluid communication with the first sump and the second sump, and is structured to drain oil from the first sump and the second sump.

15. The compressor of claim 11, wherein the compressor housing includes a casting; and wherein the passage is a cast passage within the casting.

16. The compressor of claim 15, wherein the compressor housing includes a cast rotor housing and a cast discharge housing attached to the cast rotor housing, wherein the passage is formed of a first cast passage in the cast rotor housing and a second cast passage in the cast discharge housing.

17. The compressor of claim 11, wherein the passage is positioned to drain oil from the first plurality of oil-lubricated bearings and the second plurality of oil-lubricated bearings when the compressor is installed in a first orientation and also when the compressor is installed in a second orientation rotationally displaced 90° from the first orientation.

18. A compressor system, comprising:
a plurality of intermeshing compressor elements, each intermeshing compressor element having a first end and a second end;
a first plurality of oil-lubricated bearings supporting the first end of each intermeshing compressor element;
a second plurality of oil-lubricated bearings supporting the second end of each intermeshing compressor element;
a compressor housing radially encompassing the intermeshing compressor elements between the first ends and the second ends; and
a passage for draining oil from the first plurality of oil-lubricated bearings, from the second plurality of oil-lubricated bearings, and from a first gear and a second gear connected to the compressor elements;

wherein the passage is structured to discharge the drained oil through a single discharge opening; and wherein the single discharge opening includes one of a fan or partial annular cross-sectional shape.

* * * * *